United States Patent [19]

Ehrat

[11] 3,740,475

[45] June 19, 1973

[54] APPARATUS FOR PRODUCING CODING PULSE SEQUENCES

[75] Inventor: Kurt Ehrat, Zurich, Switzerland

[73] Assignee: Ciba-Geigy AG, Basel, Switzerland

[22] Filed: Aug. 16, 1971

[21] Appl. No.: 172,135

[30] Foreign Application Priority Data

Aug. 24, 1970 Switzerland ........................ 12592/70

[52] U.S. Cl. ................................................ 178/22
[51] Int. Cl. ................................................ H04l 9/00
[58] Field of Search ........................................ 178/22

[56] References Cited

UNITED STATES PATENTS

| | | | |
|---|---|---|---|
| 3,515,805 | 6/1970 | Fracassi et al. | 178/22 |
| 3,627,928 | 12/1971 | Wolper et al. | 178/22 X |
| 3,681,708 | 8/1972 | Olmstead | 178/22 X |

*Primary Examiner*—Benjamin A. Borchelt
*Assistant Examiner*—A. M. Psitos
*Attorney*—Pierce, Scheffler & Parker

[57] ABSTRACT

Coding apparatus is provided which comprises a mixer for mixing a long-period pulse sequence with a secret code to produce a code pulse sequence which is fed to a number of shift registers interconnected by logic circuits so that each code pulse is defined by the binary values of previously occurring control pulses, the time duration of these previously occurring control pulses being made variable in dependance on the secret code.

15 Claims, 11 Drawing Figures

APPARATUS FOR PRODUCING CODING PULSE SEQUENCES

BACKGROUND OF THE INVENTION

The invention relates to apparatus for producing reproducible, pseudostatistic coding pulse sequences for encoding messages in which a control pulse sequence, produced from a long-period pulse sequence and a pulse sequence dependent on a secrecy code, is converted into a code pulse sequence in shift register stores interlinked by logic circuits so that the binary value of each code pulse is defined by the binary values of a plurality of control pulses, supplied earlier with respect to time to the shift register stores and that each code pulse remains unaffected by that part of the control pulse sequence which occurs prior to the affected code pulse by the so-called transit time, referred hereinbelow as the total transit time.

In apparatus of this kind, often described as code computers, the code stability increased with the total transit time. On the other hand, an excessive total transit time causes great difficulty or even prevents the access by a third participant (each participant having a separate identically constructed code computer) into an established encoded communicator system. In particular, third parties must await elapse of the total transit time before being able to gain access to the system. Hitherto it has not been possible to satisfy these two contradicting requirements for optimum coding stability and simple access facilities for authorised parties into an established encoded system.

SUMMARY OF THE INVENTION

According to the invention this disadvantage is eliminated by means adapted to change the total transit time from a larger to a smaller value at time intervals which depend on the secrecy code and persist for a defined period of time.

Simple means of access are provided in those periods of time in which the total transit time is reduced when using the apparatus according to the invention (each participant having one set of apparatus). On the assumption that an identical synchronised control pulse sequence is available or may be produced for all authorised participants, it is necessary to await only the shortened total transit time on the access side and during the aforementioned periods of time when the code computer is switched to the shortened total transit time. Accordingly, the access side code computer will contain only data associated with the connection established at that time; all data previously stored in the code computer shall have been discharged from it. Since the position with respect to time of the shortened total transit times depends on the secrecy code, it follows that the code stability is not greatly reduced and therefore access by unauthorised parties into an established system is not facilitated. Change-over to the shortened total transit time of the code computer awaiting access should preferably be performed automatically. This is particularly simple and appropriate if change-over is controlled by the control pulse sequence or some other pulse sequence derived from the date and clocktime and from the secrecy code.

In apparatus of the kind disclosed by the invention, the total transit time is not normally constant but fluctuates within defined limits. The mean value of the total transit times may be regarded as constant in known apparatus.

A preferred embodiment of the invention is characterised in that at least one circuit part is so constructed that the mean value of its transit times, described hereinbelow as partial transit times, does not exceed a defined magnitude, that a feedback circuit extends from the output of the aforementioned circuit part to its input, that the means for changing over the total transit time interrupt the feedback circuit at intervals of time depending on the secrecy code and for a defined period of time, the said periods of time being so defined that during a given period of time at least one of the feedback interruptions is longer than the simultaneously occurring partial transit time. The means of access will be provided in those periods of time in which the feedback interruption simultaneously exceeds the partial transit time.

BRIEF DESCRIPTION OF THE DRAWINGS

Embodiments of the invention will be explained hereinbelow by reference to the drawings in which.

DESCRIPTION OF THE PREFERRED EMBODIMENTS

Figure 1:
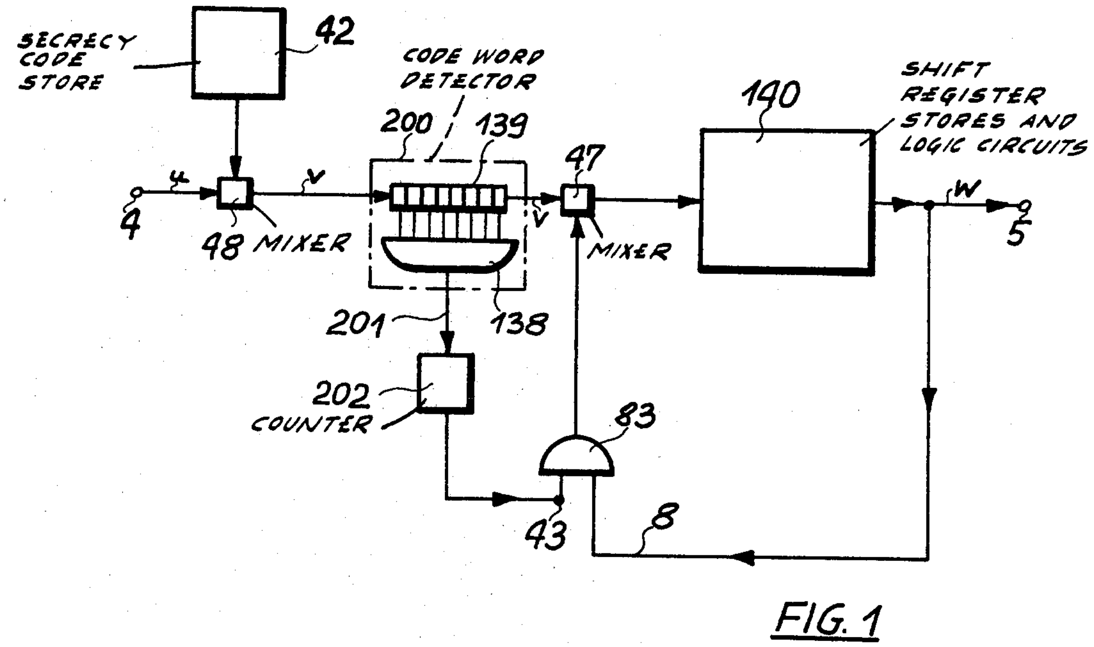
FIGS. 1 to 10 show ten different forms of apparatus for encoding pulse sequences.

Each of the illustrated sets of apparatus is operated from a timing source TQ which delivers timing pulses having a periodicity of $T= 1/f_T$, where $f_T$ refers to the timing frequency. The inputs of the sets of apparatus are generally designated with the numeral 4 and their outputs with the numeral 5. A long-period pulse sequence *u* is fed through the input 4 into a modulo-2 mixer 48. The pulse sequence *u* need not be secret. The secret code elements are called up from a secrecy code store 42 and, in the mixer 48, are mixed at the timing frequency $f_T$ with the long-period pulse sequence *u*. The pulse sequence supplied by the mixer 48 represents the control pulse sequence which depends on the secrecy code and is designated *v*. In the subsequent stages the aforementioned control pulse sequence *v* is used to form the code pulse sequence, also secret, and designated *w* and being delivered from the apparatus through the output 5.

According to FIGS. 1 to 4 each of the blocks designated 140 contains a circuit part comprising shift register stores and logic circuits having a defined means data transit time $T_D$. On the input side each of these blocks is connected through a mixer 47 and a code word detector 200 to the mixer 48 which supplies the control pulse sequence *v*. Moreover, the output of each of these blocks is fed back through a conductor 8, a gate circuit 83 and the second input of the mixer 47 to its own input. The gate circuit 83 is controlled by the code word detector 200. Said detector comprises a shift register 139 and an AND circuit 138. A signal will then appear at the output of the aforementioned AND circuit on each occasion when the part of the control pulse sequence *v*, stored at that moment in time in the shift register 139, coincides with the desired code word to which the detector is set.

According to FIG. 1 the AND circuit 138 drives a counter 202 through a conductor 201 so that the counter 202 is triggered for a counting period $T_z$ whenever a pulse occurs on the conductor 201. The counter output is connected to an input 43 of the AND circuit 83 and is controlled so that a logic "1" appears at the output of the counter when it is at rest and a logic "0" occurs during its operation. Accordingly, whenever the counter is triggered, the AND circuit 83 interrupts the feedback path between block 140 and mixer 47 for one counter period $T_z$. Since the control pulse sequence $v$ depends on the secrecy code it follows that the position with respect to time of these interruptions of the feedback path depend on the secrecy code and are therefore unknown to unauthorised third parties.

Given a word of $n$ bits for the code word in the detector 200, a desired code word (i.e., a detected code word) of the control sequence $v$ will occur on average every $2^n$ timing pulses in the code word detector. For example if the timing frequency $f_t$ amounts to 1,000 pulses per second and the word length of the code detector amounts to 10 bits, the average length of time between two interruptions of the feedback path will be 1 second. This period of time would be equal to 1,000 seconds given a word length of 20 bits and so on.

Figure 1A:
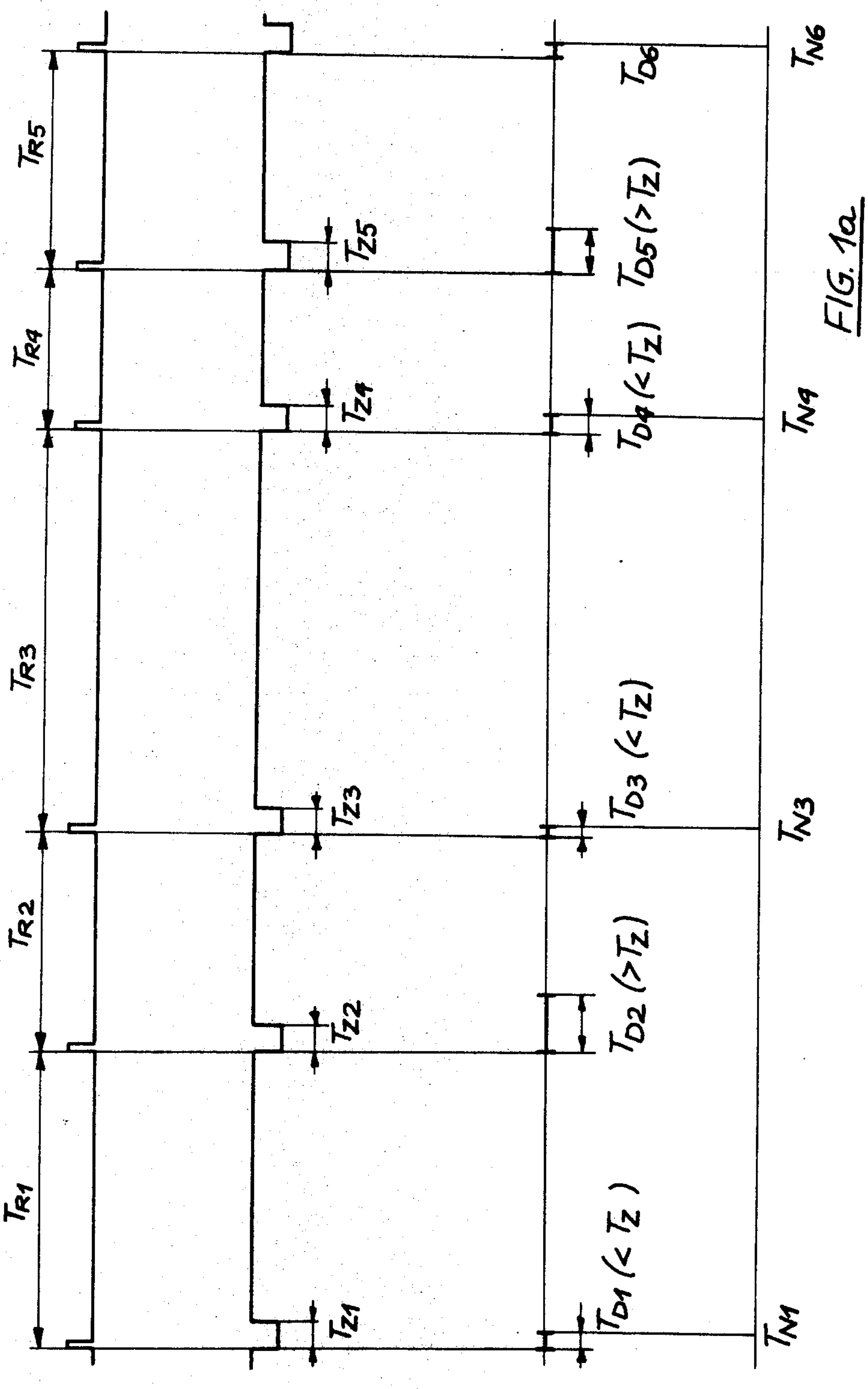
FIG. 1*a* is a graph showing the method of operation of the apparatus disclosed in FIG. 1.

The timing sequences for the arrangement of FIG. 1 are shown in graph form in FIG. 1*a*. FIG 1*a* shows in the first line the trigger pulses $T_{R1}$, $T_{R2}$, $T_{R3}$, .... supplied by the AND circuit 138 to the counter 202, the second line shows the periods of interruption $T_{Z1} = T_{Z2} = T_{Z3} = T_{Z4} = T_{Z5} = T_Z$ of the feedback path, the third line showing the transit times $T_{D1}$, $T_{D2}$, $T_{D3}$, .... of the circuit part 140 and the fourth line shows the possible access times for third parties. The system of FIG. 1 is preferably so arranged that $$T_Z = T_{D1} + T_{D2} + T_{D3} + \ldots + T_{Dn}/n = T_D$$

that is to say the period of time during which the feedback path is interrupted is approximately of the same magnitude as the means value $T_D$ of the transit times of the circuit part 140 which is provided with feedback. This ensures that the "old" data has "sufficient opportunity" to disappear. This is an essential prerequisite before a third participant may gain access to the system.

In the illustrated example and in accordance with the third line of FIG 1*a*, the transit time $T_{D1}$ during the first interruption is shorter than $T_z$. Accordingly, the "old" data may be discharged and from the time $T_{N1}$ (last line) onwards it would be possible for a third participant to gain access. During the second interruption the transit time $T_{D2}$ is longer than $T_z$ and the "old" data will not disappear in this case but only at the time $T_{N3}$ when $T_{D3}$ is once again shorter than $T_z$ and so on.

The reason why $T_z$ is not made substantially longer than $T_D = T_{D1} + T_{D2} + \ldots + T_{Dn}/n$ is that it is desirable for unauthorised parties to be uncertain as to whether the "old" data is or is not still present. Any unauthorised decodeing is thus made substantially more difficult.

The trigger times and therefore the position with respect to time and the length of the intervals $T_{R1}$, $T_{R2}$, .... (first line of FIG. 1) as wll as the transit times $T_{D1}$, $T_{D2}$, .... (second line of FIG 1*a*) depend on the secrecy code and are therefore not known to unauthorised parties so that any unauthorised decoding is rendered additionally more difficult.

Figure 2:
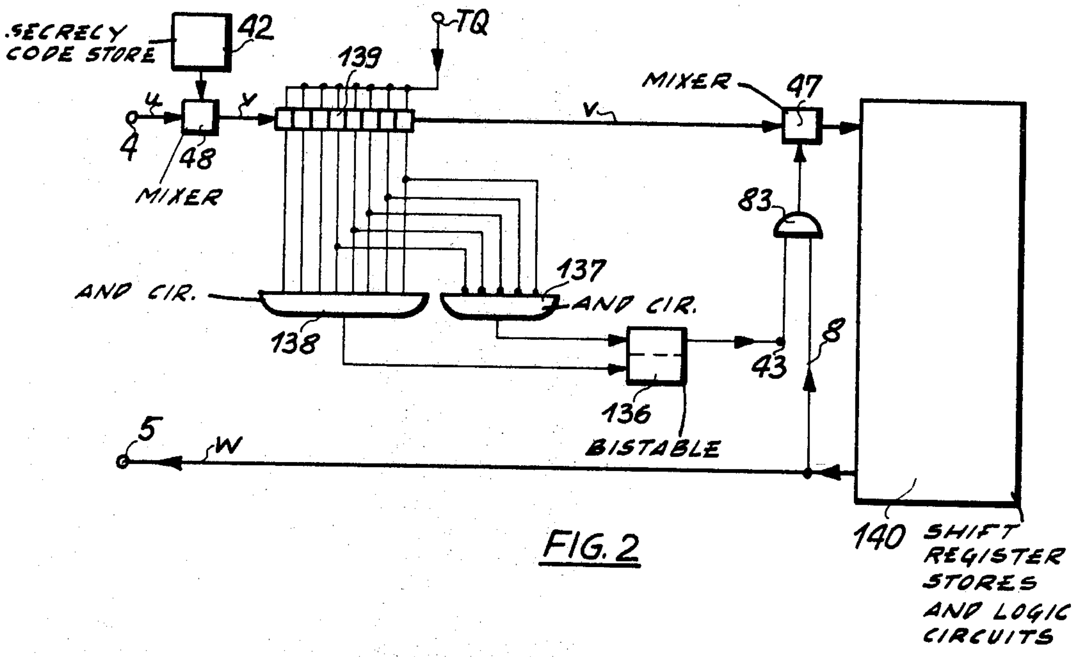

The embodiment of FIG. 2 differs from that of FIG. 1 substantially by virtue of an additional AND circuit 137 and a bistable stage 136 which drives the AND circuit 83. A logic "1" on the output of AND circuit 137 triggers the bistable stage 136 into the circuit condition in which the AND circuit 83 is driven into the conductive state while a logic "1" on the output of AND circuit 138 drives it into the inverse circuit condition. The AND circuits 137 and 138 in turn are driven by data obtained from the shift register 139 which contains secrecy code elements in addition to the long-period pulse sequence.

Figure 3:
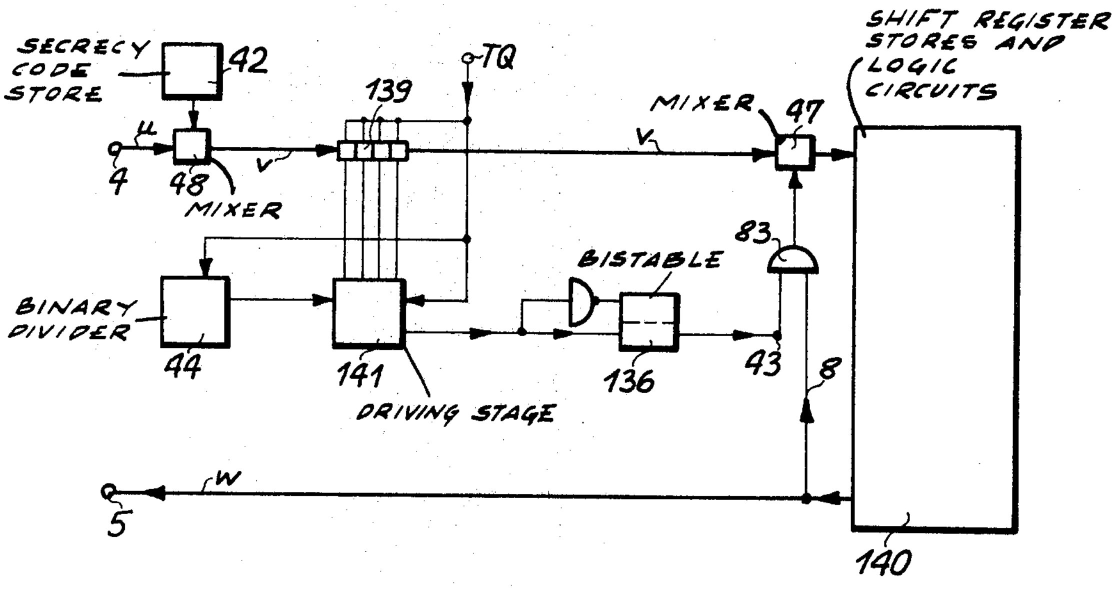

FIG. 3 shows a circuit which is similar to that of FIG. 2. The bistable stage 136 in this case however is driven by a stage 141, controlled by the timing source TQ through an auxiliary binary divider 44 which delivers control pulses of different duration to the bistable stage 136.

Figure 4:
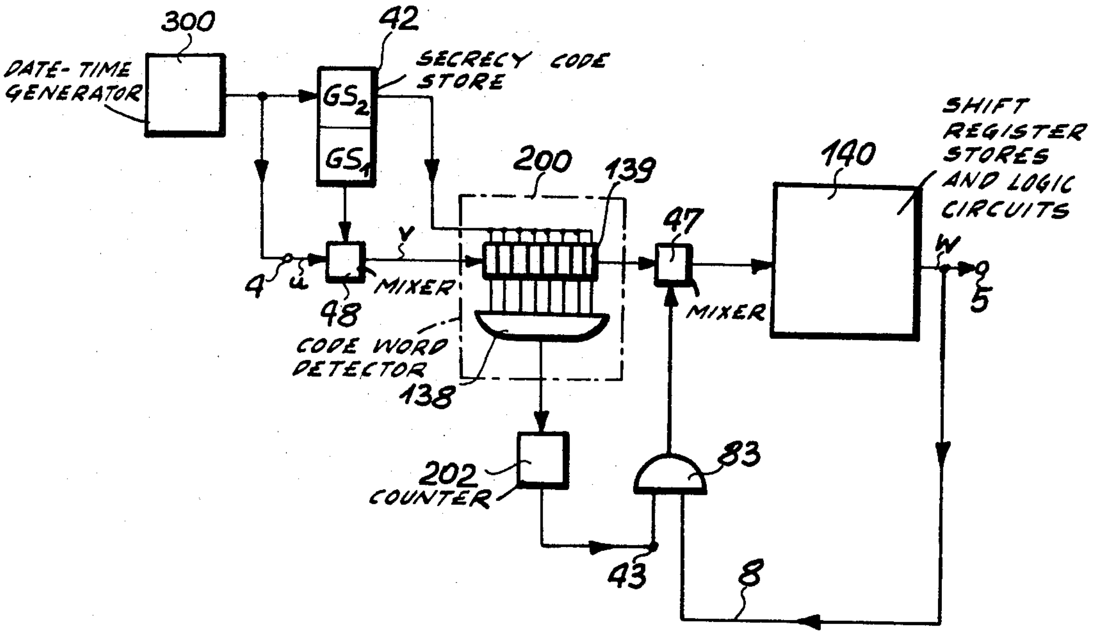

The embodiment of FIG. 4 differs from that of FIG 1 substantially by virtue of the fact that the desired code word of the code word detector 200 is varied by the date and time relative to the secrecy code. The secrecy code store 42 is keyed by a date-time generator 300, provided with a divider which also supplies the long-period pulse sequence $u$. At intervals defined by the date and time, the desired code word of the detector 200 is formed by defined secrecy code parts or is influenced thereby and altered. The secrecy code of the present example comprises two parts, one part $GS_1$ being used for forming the control pulse sequence $v$ and the other part $GS_2$ being used for forming the desired code words.

Figure 5:
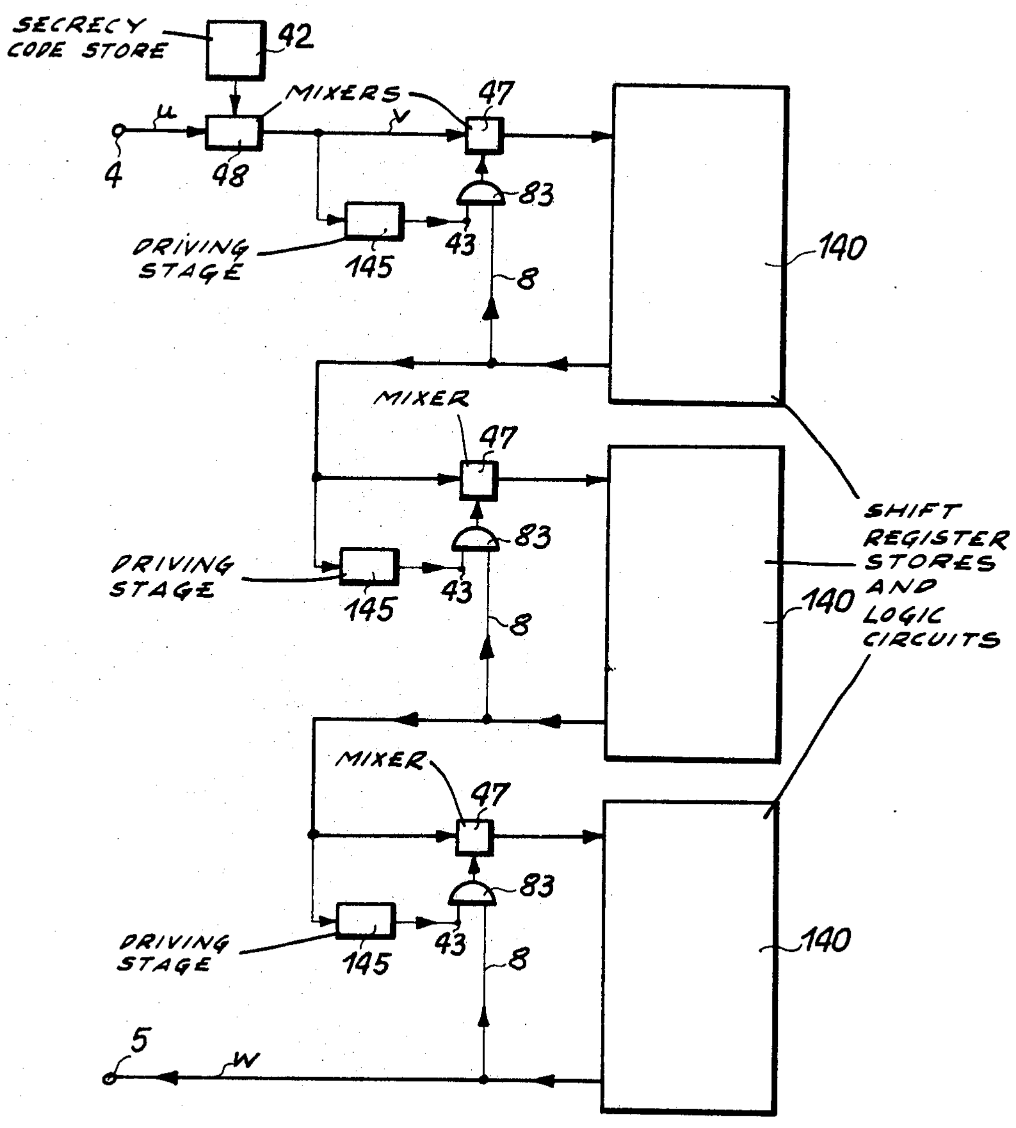

FIG. 5 shows as a further embodiment comprising a system of cascaded circuits, each in accordance with one of those shown in FIGS. 1 to 4. Each of the AND circuits 83 in the feedback path is driven by a stage 145. Each of these stages 145 may be constructed in accordance with one of the circuits shown in FIGS. 1 to 4, namely circuits 139–138–202 (FIG. 1), circuits 139–138–137–136 (FIG. 2), circuits 139–141–44–136 (FIG 3) or circuits 42– 139–138–202 (FIG 4). Each of the three feedback paths 8 must be interrupted at least once in order to facilitate access by authorised third parties into an encoded system when using the cascade circuit illustrated in FIG 5.

The circuit part 140, shown in its entirety as a block in FIGS 1 to 5, will be explained hereinbelow by reference to detailed embodiments; further variations of the feedback circuit will also be shown. In all subsequent illustrations the principal directions of data flow will be indicated by arrows D. The shift registers and other circuit parts are controlled at the timing frequency $f_T$ by the timing source TQ. To facilitate understanding the method of operation some switches (51, 68, 78) in the illustrations are shown as mechanical switches but in practice they are electronic switches.

Figure 6:
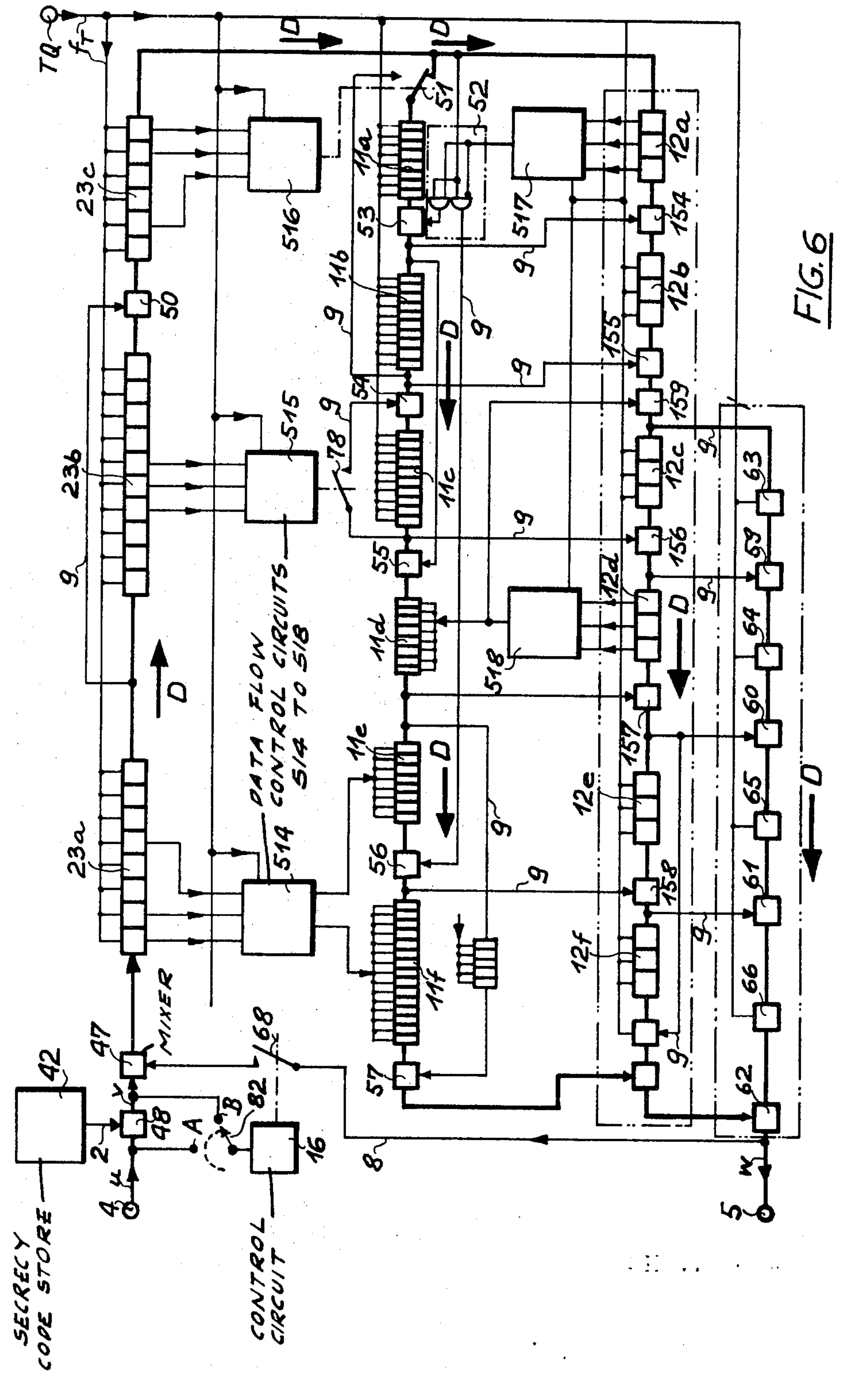

In the embodiment illustrated in FIG 6 the control pulse sequence $v$ is supplied through the mixer 47 to a first shift register chain 23*a*, 23*b*, 23*c*. A modulo-2 mixer 50, into which a data flow shunt path 9 enters bridging the shift register 23*b*, is interconnected between the shift registers 23*b* and 23*c*. From the output of the shift register 23*c* the data flow passes on the one hand through a change-over switch 51 (electronic) to the input of a second shift register chain 11*a* – 11*f* which is provided with a plurality of data flow shunt paths 9 and modulo-2 mixers 53 to 57. On the other hand the data flow from the output of the shift register 23*c* is mixed through a gate circuit 52, either through the modulo-2 mixer 53 or through the modulo-2 mixer 56 with the data flow of the shift register chain 11*a* to 11*f*. The data flow is also conducted from the shift register 23*c* into a third shift register chain 12 *a* to 12*f*. A plurality of data flow shunt paths 9 branch from the shift register chain 11*a* to 11*f* and mix through modulo-2 mixers 154 to 158 with the data flow of the shift register chain 12*a* to 12*f*. Data flow control circuits 514 to 518 are connected to the shift registers 23*a* to 23*c* as well as 12*a* and 12*d*, said data flow circuit obtaining their input data from the shift register chain 23*a* to 23*c* or 12*a* to 12*f* to produce therefrom data flow control functions which control the data flow in the shift register chain 11*a* to 11*f* and in some of the data flow shunt paths 9. Data flow shunt paths 9 finally extend from the shift register chain 12*a* to 12*f* into a chain comprising modulo-2 mixers 59 to 62 and shift register stages 63 to 66. The code pulse sequence *w* may be taken off from the output 5.

The code pulse sequence *w* occuring at output 5 is mixed through the feedback path 8 and the modulo-2 mixer 47 with the control pulse sequence *v*. The feedback path 8 incorporates a switch 68 (electronic) which is actuated by a control circuit 16. The said control circuit in turn may be optionally connected by means of a change-over switch 82 (mechanical) to the long-period pulse sequence *u* or to the control pulse sequence *v*. With the change-over switch 82 in position A or B respectively, the switch 68 will then be opened by the control circuit 16 for a defined time interval ($T_Z$) if a defined code word occurs in the pulse sequence *u* or *v* respectively (see also FIGS 1 to 4).

The code computer should not become self-energised when the switch 68 is open; after a certain period of time has elapsed, the code computer itself may contain only flow data which depends on the control pulse sequence *v*.

This condition is made in order to permit access by third parties into an existing encoded system without the third parties having participated from the beginning. To make clear this requirement of "non-self-energising of the code computer" when the feedback path 8 is open it is possible to feed in a control pulse sequence comprising wholly of logic "0" with a single logic "1" therebetween. Under conditions of "non-self-energisation," no further "1" will occur after a defined time on the output 5 but only a succession of "0."

The data flow control functions produced by the data flow control circuits 514 to 518 are evaluated in different forms. For example, the data flow control circuit 516 intermittently operates the change-over switch 51. The data flow control functions produced by the data flow control circuit 517 and cooperating with the two AND circuits of the logic function 52 result in a temporary data flow change-over to the modulo-2 mixer 53 or the modulo-2 mixer 52 so that the data flow is temporarily coupled at two different points to the shift register chain 11*a* to 11*f* which also functions as a delay line. The data flow control function of the data flow control circuit 515 causes temporary closure of a switch 78 (electronic) so that the data flow contained in the shift register 11*c* is intermittently "circulated" and at the same time mixed in the modulo-2 mixer 54 with the data flow entering therein. The data flow control circuit 514 produces data flow control functions which either intermittently suppress or intermittently engage data flow shift in the associated shift registers 11*e* and 11*f* through the shift lines $f_T$ thereof. The data flow control circuit 518 produces data flow control functions which on the one hand act on the shift register 11*d* and on the other hand on the modulo-2 mixer 159.

Figure 7:
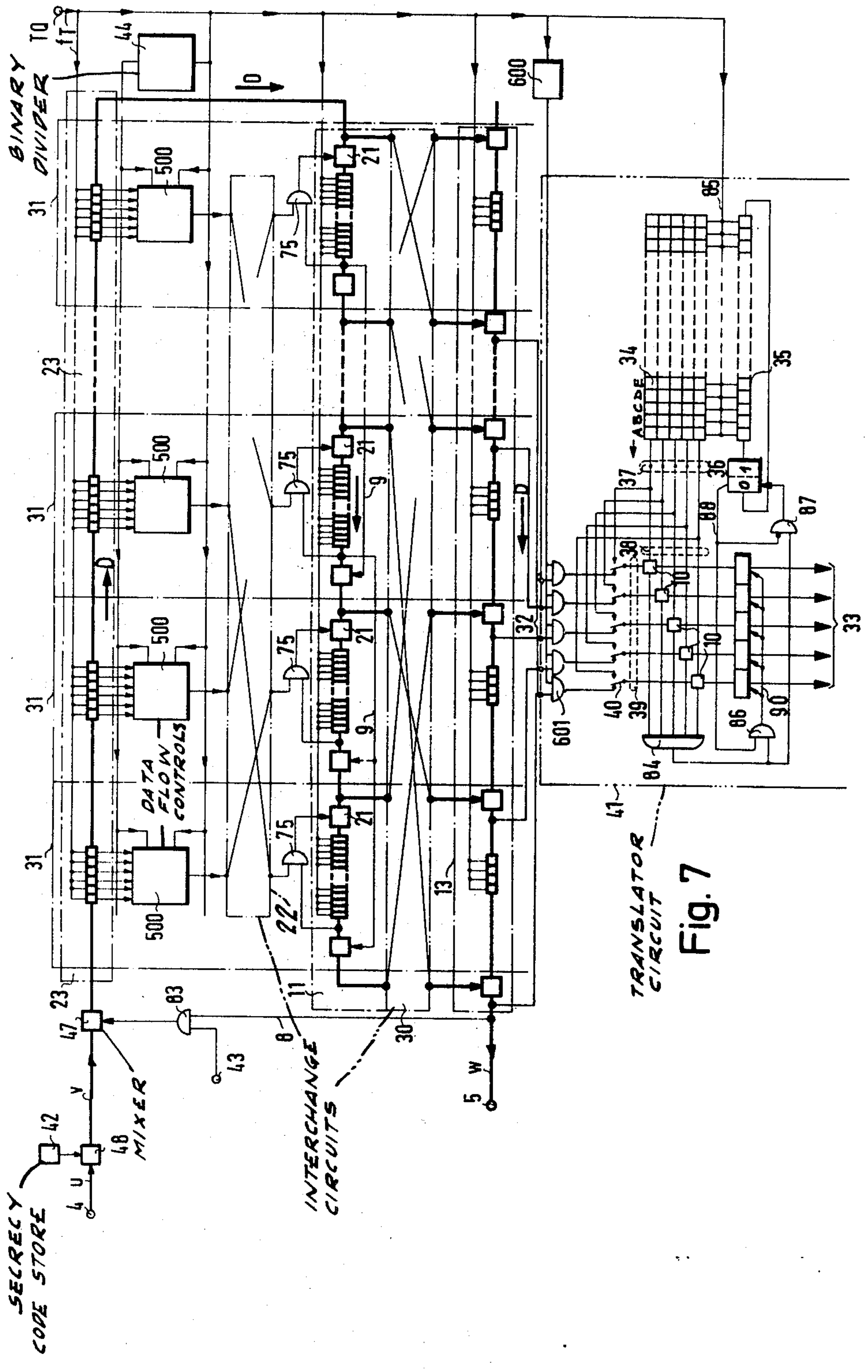

FIG. 7 shows a circuit similar to that of FIG 6. The circuit of FIG 7 comprises three shift register chains 23, 11 and 13. The shift registers 23 have data flow control circuits 500 connected to them which in turn are controlled by the timing source TQ and by an auxiliary binary divider 44. The output of one of the data flow control circuits 500 will be set to a logic "1" during a fraction of the time occupied by a counting period of the binary divider 44 so that the associated circuit 75 is driven into the conductive state and the data in the associated shift register 11 is "circulared" During the remaining period of time of the aforementioned counting period the output of the data flow control circuit will be set to a logic "0" and the associated circuit 75 will be driven to cut-off. The magnitude of the two time proportions is defined by the data of the associated shift register 23 at the moment at which each counting period begins. However, by contrast to FIG 6, the data flow control functions produced by the data flow control circuit are transmitted to the shift register 11 not directly but through a first interchange circuit 22. The interchanges in the interchange circuit 22 may depend on the secrecy code and may be changed automatically, for example depending on date and time. The data flow control circuits 500, cooperating with AND circuits 75 and modulo-2 mixers 21 cause intermittent "circulation" of the data flow contained in the shift registers 11. The data flows provided by the shift registers 11 are conducted through a second interchange circuit 30 to the shift register chain 13. Interchanges in the aforementioned second interchange circuit 30 may also be secret and may thus be constituent parts of the secrecy code elements.

The feedback path is once again designated 8 and is applied through the AND circuit 83 with the control input 43 which in turn is connected to a control circuit (not shown), which may be constructed in accordance with any of the preceding embodiments.

The circuit illustrated in FIG 7 may comprise sixteen 64-stage store shift registers which are driven by sixteen data flow control circuits 500. Each of the data flow control circuits 500 has six inputs. If they are constructed as binary dividers they will have a maximum operating period of $2^6 \cdot 24$ timing steps. Each will then be connected to a 6-stage shift register 23 so that sixteen of such shift registers enables a total number of 72 stages of shift registers 23 to be obtained. Since this number of stages is greater than the operating cycle number of the binary dividers it will ensure that each individual bit which passes through the shift registers 23, will influence any one of the data flow control functions with certainty.

The circuit according to FIG 7 may be constructed of individual and identical circuit modules 31. To this end, each circuit module includes part of the shift register chain 23, a data flow control circuit 500, part of the shift register chain 11 and part of the shift register chain 13. In this way it is possible for almost the entire code computer to be constructed from identical modules. Furthermore, this feature enables code computers of different size to be constructed from identical circuit modules.

Clear-language data may be encoded in known manner by mixing the encoding programme *w* (coding pulse sequence) with the clear-language data in a modulo-2 mixer. However, the code computer illustrated in FIG 7 also permits direct encoding of coded characters (letters and figures) by generating encoded symbols which are unequivocally associated with coded letters of the alphatbet or numerals of the clear-language data. This kind of coding may be referred to as "substitution coding." An entire alphabet of coding characters, determined under "pseudo random" conditions in the code computer is made available in the circuit system of FIG. 7 for each letter which is to be encoded. This means that a full coding character alphabet is produced for each clear-language text letter which is to be freshly encoded, each letter occurring once but only once in said coding character alphabet so that the substitution is completely unequivocal. The pseudo-static sequence of the aforementioned coding character alphabet (which varies from clear-language text letter to clear-language text letter) is compared with a fixed sequence of the clear-language text alphabet and the relationship between clear-language text letter to encoded letter or encoded character is determined by these means.

"Substitiution encoding" is performed in that part of the circuit of FIG 7 which is designated in its entirety with the numeral 41. The circuit part 41, described hereinbelow as a translator circuit is designed for encoded characters (letters or numerals), characterised by 5 bits. A design for either more or less than 5 bits is of course also possible. The bit groups ($2^5 = 32$) are obtained as encoded characters of the shift register chain 13 from an output 32 and are supplied to the translator circuit 41. The coded character data passes through change-over switches 40 to the first input 39 of binary comparators 10. The second input 38 of the binary comparator 10 is supplied from a "Read-Only-Memory" 34, referred to hereinbelow as ROM. The ROM 34 contains in coded form all characters of the alphabet which can be called up in sequence and which appear at the output 37 connected to the second input 38 of the binary comparator 10. A binary stage which may be set to "0" or "1" and being associated with an auxiliary shift register 35, is associated with each encoded letter in the ROM 34. The auxiliary data of the shift register 35 occurs in its binary output stage 36 whenever the associated ROM character appears at the output 37 of the ROM and is transferred to the second input 38 of the binary character comparator 10. Whenever a coding character alphabet begins to be formed (variable pseudostatic substitution alphabet) the auxiliary data of the auxiliary shift register 35 will be set throughout to zero. A comparison with all alphabet characters contained in the ROM 34 will be performed for every coding character fed in freshly by the code computer into the binary character comparator 10, that is to say while a coding character is stored in the binary character comparators 10 the character will be compared sequentially with all characters contained in the ROM 34, the individual characters being called up from the ROM 34 and the data being shifted in the auxiliary shift register 35 in synchronism by means of the shift line 85. The shift register 13 feeds the bit groups through the AND circuits 601 which are timed by a timing step-down element 600 so that only one bit group is fed in for each complete cycle of the ROM 34. The outputs of the binary comparators 10 are fed to an AND circuit 84. If the code character coincides with one of the characters called up from the ROM 34, a coincidence pulse will occur at the output of AND circuit 84, said pulse being supplied on the one hand to an AND circuit 86 and on the other hand to an AND circuit 87. If the letter corresponding to the aforementioned code character is not yet present in the code character alphabet, its momentary auxiliary bit will be set to "0" in the output stage 36 of the auxiliary shift register 35. Accordingly, a pulse "0" will arrive through the conductor 88 and on the one hand drive the AND circuit 87 into the conductive state, and, by means of the coincidence pulse of the AND circuit 84, sweep the auxiliary shift register 35 into the bistable state "1." The aforementioned "1," associated with the letter determined in the ROM 34 means that this letter will be occupied from them onwards in the code character alphabet. The code character determined in this way is transferred through an intermediate store 89 to a code character output 33. Subsequently the code computer sets a fresh pseudo-statistic code character into the binary code comparator 10 where it is once again compared in sequence with the entire alphabet of the ROM 34. If the letter corresponding to the code character is already present in the code character alphabet, the auxiliary data bit corresponding to the said character will be set to "1" in the output stage 36 of the auxiliary shift register 35. Accordingly, a pulse "1" will arrive through the conductor 88. The pulse "1" is transferred to the AND circuit 86. If a coincidence pulse arrives simultaneously from the AND circuit 84, the AND circuit 86 will become conductive and deliver a cancelling instruction to the intermediate store 89 through a conductor 90. This ensures that the character is not utilised and a double or multiple occurrence of identical characters in a code character alphabet is avoided. The switches 40 are reversed after a suitable period of time, for example a time after which all characters of the alphabet were supplied by the code computer with a 99 percent probability. Accordingly, the output 37 of the ROM 34 is briefly connected to the first inputs 39 as well as to the second inputs 38 of the binary comparators 10. The letters which may also not yet be contained in the code character alphabet and are designated by "0" in the auxiliary shift register 35, will then be determined directly from the ROM 34 and will be transferred to the code character output 33 to complete the code character alphabet. The code character alphabet formed in this manner may then be stored. The same translator circuit 41 may be employed for coding and decoding, the "clear-language text sequence" of the ROM 34 being associated with the "code text sequence" of the code character alphabet.

The character alphabet or code character alphabet may of course also contain switching instruction characters in addition to alpha-numeric characters (letters,-numerals). Such switching instruction characters may be used in transmission intervals (in the absence of clear-language data) in so-called coded on-line transmission. It is desirable for reasons of cryptology that the coding routine is not transmitted for a prolonged period of time without being covered by a clear-language data. A switching instruction character of the kind described hereinabove thus enables automatic change-over during transmission gaps to "filler text encoding," where such filler text may be nonsense, its further processing (for example print-out on a teleprinter) being prevented on the reception side by control with the switching instruction character.

Figure 8:
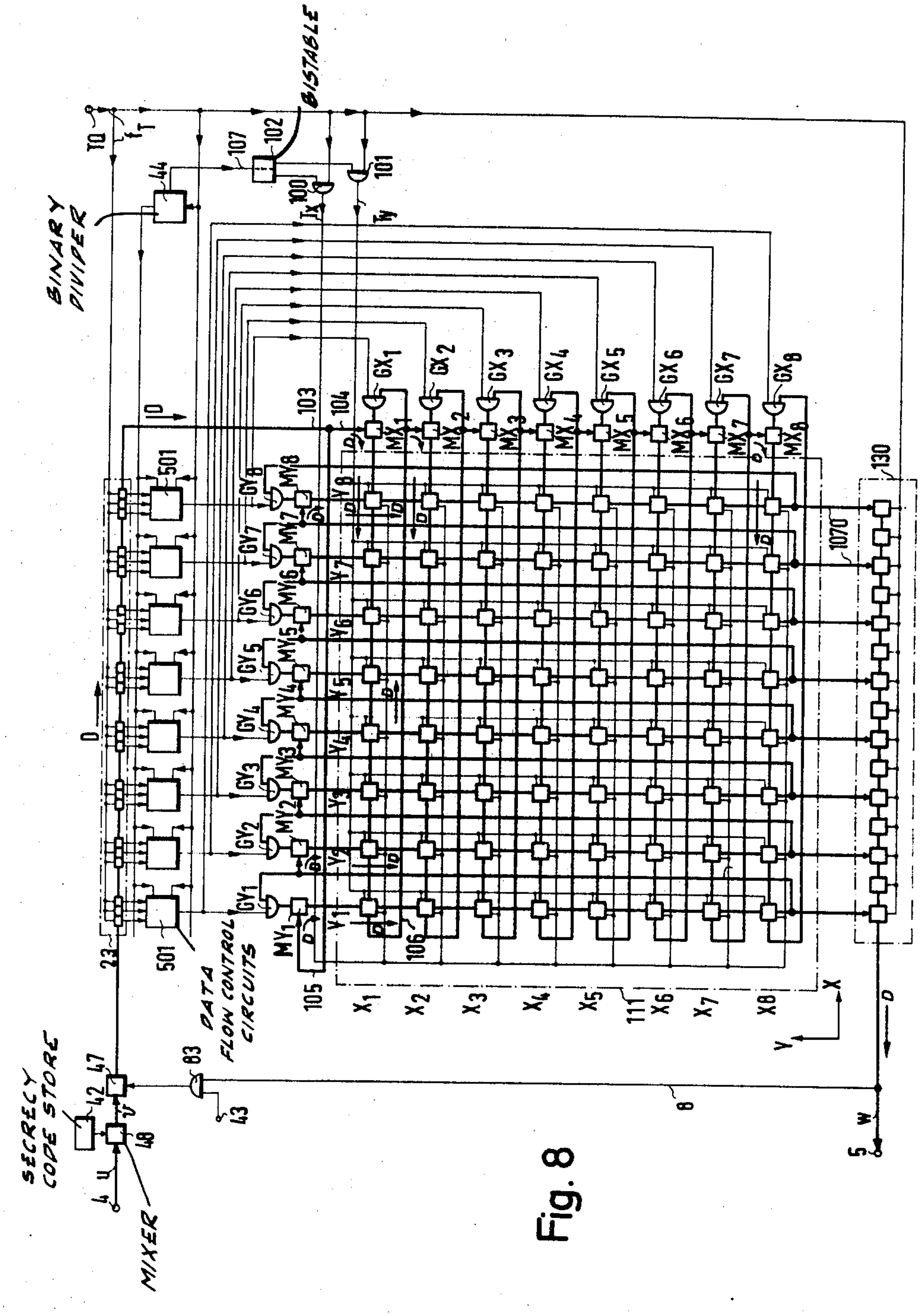

The embodiment illustrated in FIG. 8 is provided with so-called XY coordinate shift registers 111. Data is shifted in the X-direction by means of shift lines, disposed parallel to the X-axis and shift in the Y-direction is performed by shift lines which are disposed parallel to the Y-axis. The aforementioned two shift lines will be referred hereinbelow as X- or Y-shift lines respectively. The shifting cycle of the X-shift lines is designated Ty and is derived from the timing source TQ through an AND circuit 100. The shifting cycle of the Y-shift lines is designated Ty and is derived through an AND circuit 101 from the timing source TQ. The AND gates 100 and 101 are connected on the other hand to a bistable stage 102 so that in one of the two positions of the aforementioned bistable stage only the Tx cycles are transmitted while only the Ty cycles are transmitted in the other position. Data in the XY shift register 111 is therefore shifted only simultaneously, either in the X-direction or in the Y-direction.

The control pulse sequence *v* passes through the feedback mixer 47 and the shift registers 23 to the conductor 103 and from there in parallel on the one hand through a conductor 104 and through a modulo-2 mixer $MX_1$ into the first stage of the first line $X_1$ of the X-coordinate register and on the other hand through a conductor and a modulo-2 mixer $MY_1$ into the first stage of the first column $Y_1$ of the Y-coordinate register. The shift cycle TX shifts the data flow in the first line $X_1$ of the X-shift register from right to left and then passes from the last stage thereof through a conductor 106 and a modulo-2 mixer $MX_2$ into the second line $X_2$ and so on through the modulo-2 mixers $MX_3$, $MX_4$, ... $MX_7$ into the lines $X_3$, $X_4$ ...$X_7$. The shifting cycle TY shifts the data flow in the first column $Y_1$ of the Y-shift register downwardly from above so that it passes from the last shift register stage through a conductor 206 and a modulo-2 mixer $MY_2$ into the second column $Y_2$ and so on through modulo-2 mixers $MY_3$, $MY_4$, ... $MY_7$ into the columns $Y_3$, $Y_4$, ,,,, $Y_7$. The lines $X_1$ to $X_8$ on the one hand and the columns $Y_1$ to $Y_8$ on the other hand are connected "in a ring" through a separate AND circuit $GX_1$ to $GX_8$ or $GY_1$ to $GY_8$ respectively. The AND circuits $GX_1$ and $GY_8$, $GX_2$ and $GY_7$, .... and $GX_8$ and $GY_1$ are separately controlled by a data flow control circuit 501 which in turn is controlled by the shift registers 23, the timing source TQ and the divider 44.

The binary divider 44 also supplies a periodic signal through a conductor 107 to the bistable circuit 102 (in each case at the end of its full cycle, simultaneously with the setting of the initial digit all X-shift data for the data flow control circuits), so that the cycles TX are effective for one cycle length of the auxiliary binary step-down element 44 and the cycles TY are effective for the next cycle length. In this way, the data flow control instructions, which intermittently drive the AND gates $GX_1$ to $GX_8$ or $GY_1$ to $GY_8$ respectively will alternately become effective for the data flow in the X-direction and for the data flow in the Y-direction. As already mentioned, the data flow passes through all X-shift registers downwardly from above to the lowest X-shift register $X_8$ during one cycle of the X-shift direction (shift pulse TX). For the duration of the X-shift cycles allX-shift registers are serially connected and for the duration of the Y-shift cycles all Y-shift registers are serially connected, the shift function, which is individual to each shift register being additionally superimposed in a ring.

Conductors 1070 extend from the lowest X-shift register (line $X_8$) to its output circuit 130.

Figure 9:
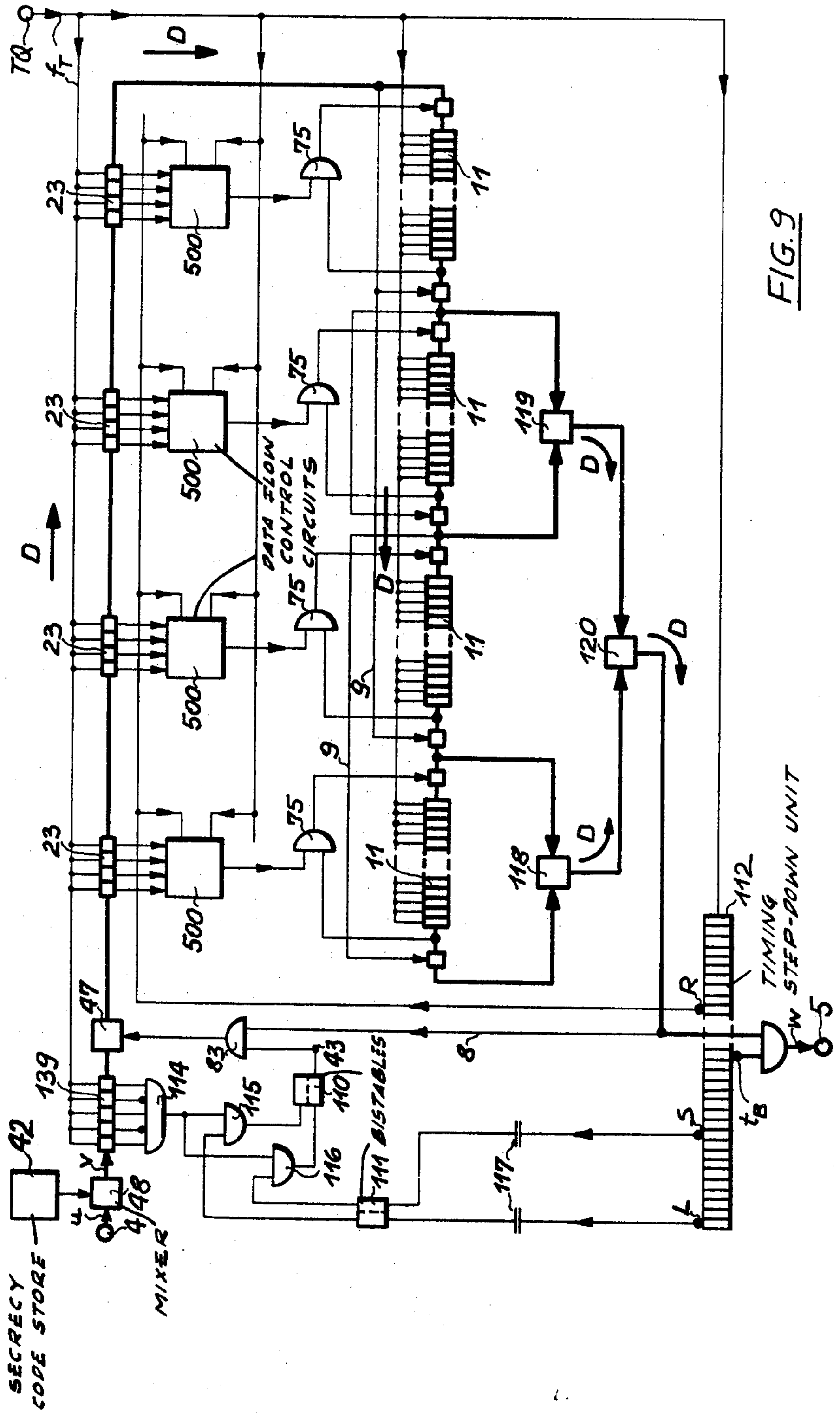

FIG 9 shows an embodiment of the code computer, similar to that of FIG 1 but being of simpler construction. Only four data flow control circuits 500 are provided and these may be constructed as binary dividers and each may be connected to a four-stage shift register 23. Periodic setting of the initial position is performed by a timing step-down unit 112 having a period containing sixteen cycles for each data flow control function. Since the total length of the shift register 23 is equal to $4 + 4 = 16$ stages, this ensures that each individual input bit contributes to the formation of one of the four data flow control functions. Each of the four shift register stores 11 may be constructed as 64-stage units (MOS shift registers). The number of stages of these four shift registers may however also be four different prime numbers, for example the numbers 47, 59, 61 and 71. In association with the forward feed data flow path 9 this results in a continuously varying relative time position of the individual data flows. The output circuit in this embodiment in this case comprises of only three modulo-2 mixers 118, 119 and 120.

The bit frequency in this case, as in the other examples, is substantially lower than the timing frequency $f_T$ of the code computer. The timing for the bit frequency is also obtained from the timing step-down element 112, namely from its tapping $t_B$.

The controllable feedback path 8 is returned through the AND circuit 83 to the mixer 47 (input). The aforementioned AND circuit is controlled by the bistable stage 110. The bistable stage 110 in turn is controlled through AND circuits 115 and 116 on the one hand by a bistable stage 111 and on the other hand by an AND circuit 114. The last mentioned AND circuit receives its data from a shift register 139 on the input side. The bistable stage 111 is driven through capacitors 117 from different tappings L (slow), S(fast). The time of the fast step-down stage (S) may amount to approximately 0.1 s and that of the slow (L) stage may amount to for example 10 s. The method of operation is such that pulses of the fast tapping (step-down stage) S trigger the bistable stage 111 which is swept back by pulses of the slow tapping (step-down stage)L. Since the pulses from L arrive only rarely, for example every 10 seconds, while those derived from S arrive in a brief sequence, for example every 0.1 seconds, it follows that the bistable stage 111 will be predominantly (practically every 10 seconds) in a position corresponding to the setting pulses of stage S. If the right-hand upper output of the bistable stage 111 were to be connected directly to the AND circuit 83, the circuit and therefore the feedback 8 would be switched on for approximately 10 seconds and would be switched off briefly for approximately 0.1 seconds. A shift register 139 and an AND circuit 114 are however also provided in order to prevent unauthorised parties from gaining knowledge of the switching-on moments and switching-off moments which are thus also made dependent on the secrecy code. This circuit ensures that the bistable stage 110 is triggered only if a certain data combination (code word) is present in the shift register 139. Sweeping back is influenced in the same manner. Accordingly, the switching-on moment and switching-off moment of the feedback path is rendered dependent on the secrecy code.

The time during which the feedback is interrupted, for example 0.1 seconds, is once again so chosen that during the aforementioned feedback-free time all store positions of the code computer are provided with a fresh data inflow. The operating interval of the closed feedback path of, for example, 10 seconds may be selected at will and it means that an authorised participant intending to enter into an encoded connection must wait for approximately 10 seconds from the moment of switching on his code computer until he is able to gain access. This time interval may be made longer or shorter as desired.

Figure 10:
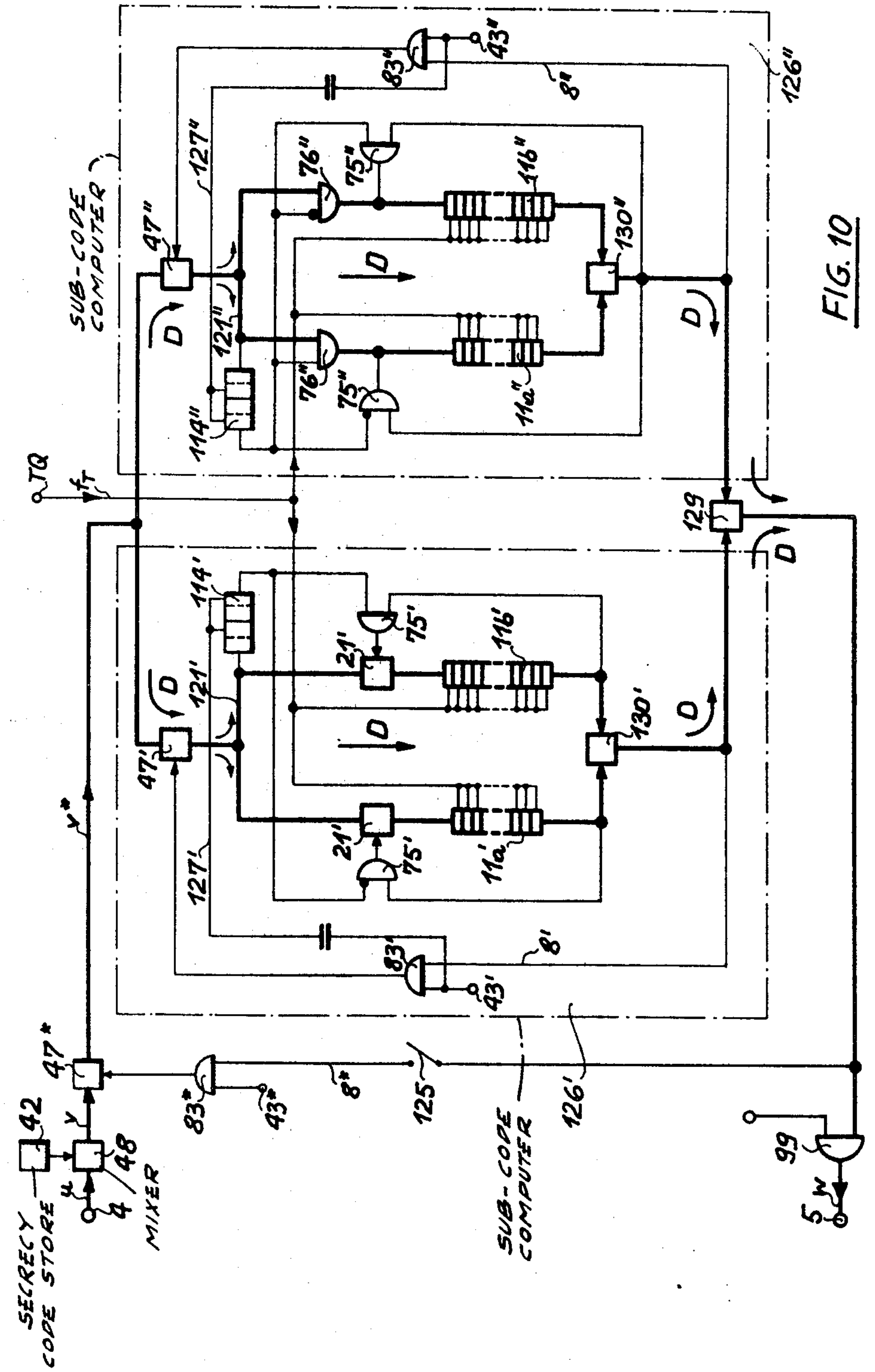

FIG 10 shows a particularly simple embodiment. The code computer comprises two parallel sub-code computers 126′ and 126″ each having a controllable feedback path 8′ or 8″ respectively. The control pulse sequence *v* or *v passes in parallel through the modulo-2 mixer 47′ or 47″ to the conductor 121′ or 121″ respectively. A separate two-stage binary step-down element 114′ or 114″, functioning as a data flow control circuit, is connected to the two conductors 121′ or 121″. The data flow control instructions delivered by the output of the aforementioned binary step-down element 114′ or 114″ in conjunction with the AND circuits 75′ or 75″ cause the intermittent code "circulation" of the data flows contained in the appropriate store shift registers 11*a*′, 11*b*′ or 11*a*″, 11*b*″ respectively. While the data flows continuously through the sub-code computer 126′, the data flow path to the left-hand store shift register 11*a*″ and the data flow path extending to the right-hand store shift register 11*b*″ is alternately opened by the action of two AND circuits 76″. The data flow passes through modulo-2 mixers 130′ or 131″ and 129 to an AND circuit 99 in which, for example, only every thousendth bit of the code computer output is selected by means of the slow bit timing frequency of a timing source TB and is used for forming the code routine. The feedback path 8′ or 8″ is switched on and off respectively at the input 43′ or 43″ of the AND gate 83′ or 83″ respectively. The time during which the feedback path is switched on in both code computers is once again substantially longer than the time during which it is switched off. The switch-off time is only as long as is necessary to occupy the store positions of the code computer with a newly incoming data flow. The moments of time at which the feedback paths 8′ and 8″ are interrupted are so matched to each other that the feedback path 9″ of the sub-code computer 126″ is approximately in the middle of its closing interval and vice versa at those moments of time in which the feedback path 8′ of the sub-code computer 126′** is interrupted.

Each of the two binary step-down elements 114′ or 114″, which function as data flow control circuits, must be triggered into a defined position whenever the feedback path 8′ or 8″ is interrupted at a certain moment of time, a function performed by the conductors 127′ or 127″ respectively.

An additional feedback path 8* – 83* – 47* is also drawn in FIG 10. The feedback path 8* is preferably controlled via the connection 43′ so that it is interrupted during the interruption intervals of the sub-code computer 126′ as well as during the interruption intervals of the sub-code computer 126″. This method of control offers the advantage that the coding routing *w* never originates from a time phase in which only forward feed is effective. The feedback path 8* may be generally switched off by means of a switch 125 (mechanically). When the switch is open, the pulse sequence designated with *v** corresponds to the pulse sequence *v*. The control pulse sequences *v* and v* have the same characteristics.

Control of the feedback paths 8′ or 8″ or 8* through the connection 43′ or 43″ or 43* and control of the output timing TB may be derived in common from the timing source TQ or from an electronic clock. The shift register stores **11*a*′, 11*b*′, 11*a*″ and 11*b*″ may be of different length, the number of stages being preferably a separate different prime number. For example, the two shift registers 11*a*′ and 11*b*′ of the sub-code computer 126′ may have stage numbers 137 and 211 respectively while the shift registers 11*a*″ and 11*b*″ of the sub-code computer 126″ may have the stage numbers 157 and 223** respectively. This also provides an exceptionally wide range of data content for the code computer. Data flows from constantly differing time zones are combined with each other by the different length of the shift registers.

What is claimed is:

1. Apparatus for encoding messages comprising, means for generating a long period pulse sequence, means for generating a secret code, means for deriving from the long-period sequence and the secret code a code pulse sequence said deriving means including a plurality of shift registers, a plurality of logic circuits interconnecting said shift registers so that the binary value of each code pulse is defined by the binary values of a plurality of control pulses supplied to the shift registers earlier with respect to time, each code pulse remaining unaffected by that part of the control pulse sequence which occurs before the affected code pulse during an amount of time referred to as the transit time and subsequently referred as the total transit time, and means changing over the total transit time at intervals depending on the secrecy code and for a predetermined period of time from a larger to a smaller value.

2. Apparatus according to claim 1, in which at least one circuit part is so constructed that the mean value of its transit times, referred to hereinbelow as partial transit times, does not exceed a defined magnitude, said circuit part having a feedback path extending from its output to its input and in which the means for changing over the total transit time interrupts the feedback circuit at time intervals depending on the secrecy code and for a defined period of time, said periods of time being so defined that at least one of the feedback interruptions is longer than the simultaneously occurring part transit time within a defined period of time.

3. Apparatus according to claim 2, in which the mean value of the partial transit times and the mean value of the feedback interruption times are defined for each circuit part and for each associated feedback circuit so that the said two mean values coincide at least approximately.

4. Apparatus according to claim 2, in which the mean values of the partial transit times are identical for all circuit parts.

5. Apparatus according to claim 2, in which at least two units, each comprising one of the circuit parts defined as regards their partial transit times and one of the feedback circuits defined as regards their interruption periods, are connected in series.

6. Apparatus according to claim 2, in which at least two units, each comprising one of the circuit parts defined with regard to their partial transit times and one feedback circuit defined with regard to their interruption periods, are connected in parallel.

7. Apparatus according to claim 2, comprising means for controlling the periods during which the feedback is interrupted, said means being controlled by a control pulse sequence dependent on the secrecy code and comprising a code word detector and being adapted to interrupt the feedback for a defined period of time whenever said detector becomes operative, said code word detector triggering a counter which in turn interrupts the feedback for the duration of its counting period.

8. Apparatus according to claim 7, in which the code word detector is provided with a desired code word setting, said code word setting being controllable relative to the secrecy code.

9. Apparatus according to claim 1, comprising means for deriving the long-period pulse sequence from the date and time.

10. Apparatus according to claim 1, in which at least parts of the secrecy code are fed in, relative to the date and time.

11. Apparatus according to claim 1, in which the logic circuits are constructed as data flow control circuits which influence the data flow intermittently in at least one other shift register relative to the data flow in at least one other register.

12. Apparatus according to claim 1, in which at least one part of the shift registers is inter-connected to form a XY coordinate shift register system, but each shift register stage forms a junction of at least two chains (X,Y) at least part of the said chains being influenced by data flow control circuits.

13. Apparatus according to claim 12 comprising means for blocking the shifting cycles of all other cycles when the shifting cycles of one chain are switched on.

14. Apparatus according to claim 1, including an output stage adapted to form code words from the code pulse sequences supplied by the shift registers connected to the logic circuits, the length of the code words corresponding to the length of code words of clear-language data, which is to be encoded and also occurs in coded form, in which the output stage for each clear-language code word produces at least one complete encoded code word alphabet with a pseudo-statistic sequence of the individual alphabet code words and that the output stage is provided with a translator stage which substitutes one code word from one of the encoded code word alphabets for each clear-language code word.

15. Apparatus according to claim 14, in which the output and translator stage is provided with a ROM store ("Read-Only-Memory") which contains all alphabet code words so that they can be sequentially called up through a parallel output, that each of the said parallel outputs is connected to the first input of each of a signal comparator, that each of the second outputs of the aforementioned signal comparators are connected to a different point of a code pulse sequence output circuit, that each of the outputs of all signal comparators are connected to a separate stage of an intermediate store, that during each cycle of the output circuit the ROM store is completely interrogated at least once, that the ROM store, the signal comparators and the intermediate store are logically connected to each other and to a marker shift register, that all code words which have already occurred once during a defined period of time are cancelled in the intermediate store and that after the said period has elapsed the second inputs of the signal comparators are changed over from the code pulse sequence output circuit to the parallel outputs of the ROM store at least for the period of one interrogation cycle of the ROM store.

* * * * *